(12) United States Patent
Madukkarumukumana et al.

(10) Patent No.: US 7,467,381 B2
(45) Date of Patent: Dec. 16, 2008

(54) RESOURCE PARTITIONING AND DIRECT ACCESS UTILIZING HARDWARE SUPPORT FOR VIRTUALIZATION

(75) Inventors: Rajesh S. Madukkarumukumana, Portland, OR (US); Gilbert Neiger, Portland, OR (US); Ioannis Schoinas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 10/738,687

(22) Filed: Dec. 16, 2003

(65) Prior Publication Data

US 2005/0132365 A1 Jun. 16, 2005

(51) Int. Cl.
 *G06F 9/455* (2006.01)
 *G06F 12/00* (2006.01)

(52) U.S. Cl. .............................. 718/1; 711/6; 711/201; 711/202; 711/203; 711/206; 710/200; 718/104

(58) Field of Classification Search .................. 718/1, 718/100–108; 711/200–206, 6; 710/200
See application file for complete search history.

(56) References Cited

U.S. PATENT DOCUMENTS

| | | | | |
|---|---|---|---|---|
| 5,522,075 A | * | 5/1996 | Robinson et al. ............ | 718/100 |
| 6,665,759 B2 | * | 12/2003 | Dawkins et al. ............. | 710/200 |
| 6,839,892 B2 | * | 1/2005 | Dawkins et al. ............. | 717/124 |
| 7,089,377 B1 | * | 8/2006 | Chen .......................... | 711/147 |
| 7,111,145 B1 | * | 9/2006 | Chen et al. .................. | 711/206 |
| 7,158,972 B2 | * | 1/2007 | Marsland ..................... | 707/10 |
| 2002/0103889 A1 | * | 8/2002 | Markson et al. ............. | 709/223 |
| 2002/0108025 A1 | * | 8/2002 | Shaylor ....................... | 711/203 |
| 2003/0110173 A1 | * | 6/2003 | Marsland ..................... | 707/10 |
| 2004/0064668 A1 | * | 4/2004 | Kjos et al. ................... | 711/202 |
| 2004/0098544 A1 | * | 5/2004 | Gaither et al. .............. | 711/154 |
| 2006/0123416 A1 | * | 6/2006 | Bertolotti et al. ............. | 718/1 |
| 2007/0067435 A1 | * | 3/2007 | Landis et al. ............... | 709/224 |

OTHER PUBLICATIONS

Sirer et al., "Design and Implementation of a Distributed Virtual Machine for Networked Computers", ACM, 1999, pp. 202-216.*
Gibson et al., "Strategic Directions in Storage I/O Issues in Large-Scale Computing", ACM, 1996, pp. 779-793.*

* cited by examiner

*Primary Examiner*—Meng-Ai An
*Assistant Examiner*—Jennifer N To
(74) *Attorney, Agent, or Firm*—Thomas R. Lane (57) ABSTRACT

The present disclosure relates to the resource management of virtual machine(s) using hardware address mapping, and, more specifically, to facilitate direct access to devices from virtual machines, utilizing control of hardware address translation facilities.

32 Claims, 4 Drawing Sheets

RESOURCE PARTITIONING AND DIRECT ACCESS UTILIZING HARDWARE SUPPORT FOR VIRTUALIZATION

BACKGROUND

1. Field

The present disclosure relates to the resource management of virtual machine(s) using hardware address mapping, and, more specifically, to facilitate direct access to devices from virtual machines, utilizing control of hardware address translation facilities.

2. Background Information

The virtualization of machine resources has been of significant interest for some time; however, with processors becoming more diverse and complex, such as processors that are deeply pipelined/super pipelined, hyper-threaded, on-chip multi-processing capable, and processors having Explicitly Parallel Instruction Computing (EPIC) architecture, and with larger instruction and data caches, virtualization of machine resources is becoming an even greater interest.

Many attempts have been made to make virtualization more efficient. For example, some vendors offer software products that have a virtual machine system that permits a machine to be virtualized, such that the underlying hardware resources of the machine appears as one or more independently operating virtual machines (VM). Typically, a Virtual Machine Monitor (VMM) may be a thin layer of software running on a computer and presenting to other software an abstraction of one or more VMs. Each VM, on the other hand, may function as a self-contained platform, running its own operating system (OS), or a copy of the OS, and/or a software application. Software executing within a VM is collectively referred to as "guest software". Some commercial solutions that provide software VMs include VMware, Inc. (VMware) of Palo Alto, Calif. and VirtualPC by Microsoft Corp. of Redmond, Wash.

Typical software based virtualization solutions utilize the privilege level protections in common processor hardware by running the entire guest software (e.g. OS and applications) at a lower privilege level, and virtualizes guest attempts to execute privileged operations by trapping to the VMM and emulating guest execution through the VMM software. However, typical operating systems expect to utilize these privilege levels to protect OS kernel from user-mode applications. For example, the Intel IA-32 processor architecture defines four privilege levels, specified as ring 0 to ring 3 in decreasing order of privilege.

Processor hardware support for virtualization, such as matter disclosed in previously filed patent application Ser. No. 09/752,134, titled "New Processor Mode For Limiting The Operation Of Guest Software Running On A Virtual Machine Supported By A Virtual Machine Monitor," by Neiger, et al., improves upon the software only virtualization solutions, through additional processor operation modes to differentiate between guest and VMM execution. Additionally it may allow flexible control of guest operations than what is offered by the coarse-grained ring based privilege levels. These additional processor operating modes for virtualization may preserve the typical ring-based processor hardware privilege levels for use by both guest and VMM software.

Typically, input/output I/O devices in the system are managed by the VMM in either one of two modes: shared mode or dedicated mode. In this context an I/O device is any device that facilitates the transfer of data to or from the core of a computer system. Examples of I/O devices may include, but are not limited to: keyboards, pointing devices, graphics adapters, network interface controllers, memory devices, hard disks, diskettes, and writable media. However, other devices are within the scope of the disclosed subject matter.

In shared mode, each VM may typically see and interact with a set of virtual devices. The VMM is typically responsible for emulating these virtual devices and mapping the virtual devices to physical devices in the system. The virtual device emulation is typically used to allow a plurality of virtual machines to share a physical device in, for example, a substantially simultaneous or time-multiplexed fashion. For example, each VM may be exposed a virtual network interface controller (NIC) device by the VMM, and the VMM may map virtual NICs from multiple VMs to a physical NIC in the system, thereby allowing these virtual machines to share the same network connection.

In dedicated mode, a VMM may assign certain physical devices in the platform for exclusive use by a specific virtual machine. I/O device assignment to VMs is typically done to improve performance. Device assignment to VMs is typically done indirectly through the VMM, such that, the VM to which a physical device is assigned is exposed to a virtual device, and the virtual device emulation in the VMM may be optimized to utilize the knowledge that the underlying physical device is assigned for exclusive use for the VM. This kind of VM I/O device assignment has inherent limits (such as reduced performance) since the guest software access to the assigned device is indirectly through the VMM. In addition to performance limitations, software emulated virtual devices also negatively impacts functionality and robustness. Since the software emulated virtual devices are often simpler devices with limited capabilities, any additional capabilities provided by the underlying physical device will not be available to the VM. The extra capabilities offered by the physical device may also be lost due to the virtualization and device emulation overheads. Since virtual device emulation requires the device drivers for the physical devices to be running as part of the privileged VMM software, it also reduces overall system robustness, as errors in any of these drivers can crash the entire system including all the VMs.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

A physical device in the system may be assigned to a VM such that the physical device resources are mapped for direct access from a virtual machine (VM). As opposed to the typical I/O virtualization solution, described above, that creates a virtual device emulated in software, direct mapping enables a VM to access the resources of the assigned physical device without entering the virtual machine monitor (VMM), thereby avoiding the associated performance overheads. In this context a VMM may include a dedicated software application, a host virtualization driver, or a host firmware. Hereafter, the above will simply be referred to as a "VMM." Direct mapped access may also allow the VM to access and utilize all the capabilities of the physical device without at least some of the limitations typically imposed by virtual device emulation. In addition, direct access to physical devices from VMs may move the device drivers for these physical devices out of the most privileged VMM software into lower privileged guest software, and thus, may improve the robustness of the overall system.

Direct access to physical I/O devices from virtual machines may involve at least two distinct components: (a) partitioning the physical I/O devices across VMs such that partitioned devices are visible only to the VM to which they are assigned; (b) enabling direct access to a partitioned device from the VM through translation mechanisms for different types of interactions between a VM and its assigned device resources, and explicitly limiting translations for other VMs to restrict accessibility to this device. The disclosed subject matter pertains to specific techniques and example embodiments for these components.

Namespaces may be applied to limit partition visibility, where a primary name space may be created to uniquely identify each physical object, secondary name spaces may be created for each virtual machine domain and applying a domain specific mapping function to map objects from primary namespace to each secondary namespace. Operating systems typically discover and configure devices by enumerating buses and devices in the I/O complex, where the enumeration utilizes well-defined naming schemes to identify and communicate with specific I/O agents. For example, Peripheral Component Interconnect (PCI) based I/O defines a depth first enumeration scheme, where each PCI bus in the system is uniquely through a bus number, each device is identified through a device number unique on its local bus and each of the device's functions through a function number unique for the local device.

Figure 1:
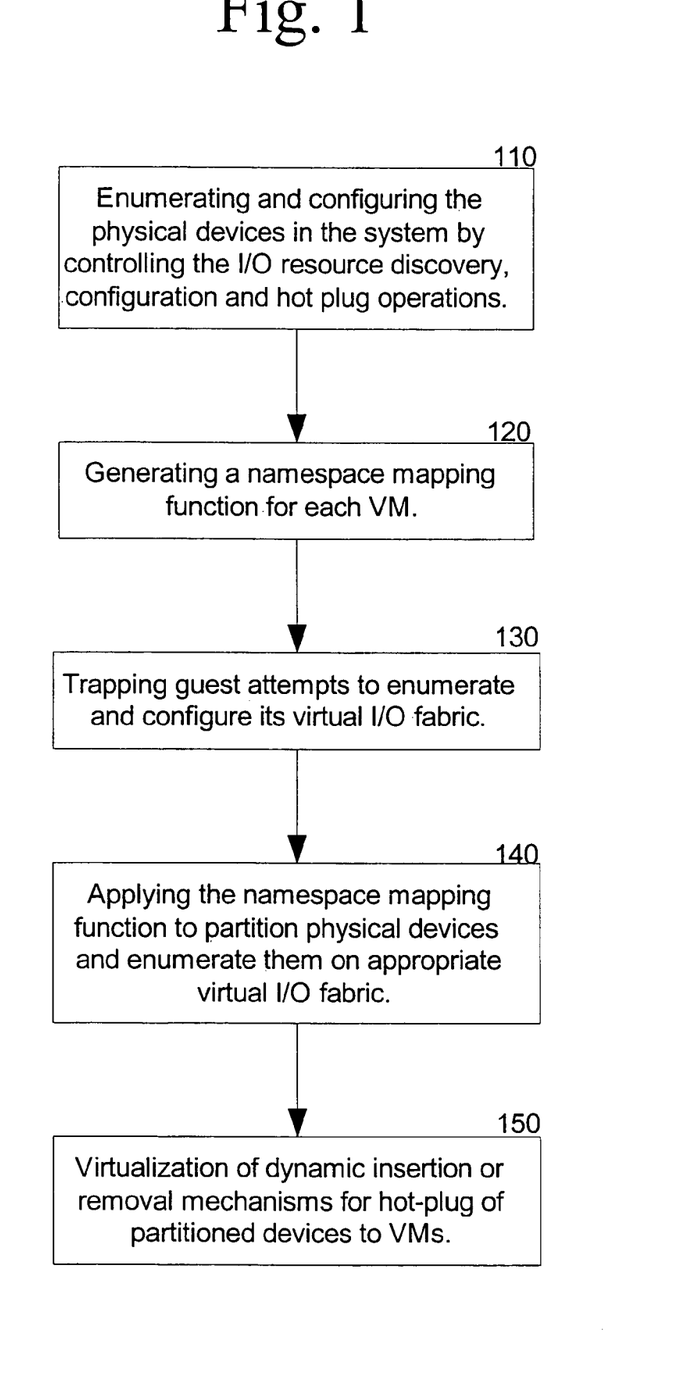
FIG. 1 is a flowchart illustrating an embodiment of a technique for exposing partitioned physical devices in the system to virtual machine(s) using namespace mapping in accordance with the disclosed subject matter.

FIG. 1 is a flowchart illustrating an embodiment of a technique for exposing partitioned physical devices in the system to virtual machine(s) using namespace mapping in accordance with the disclosed subject matter. Block 110 illustrates that the VMM may enumerate and configure the physical devices in the primary namespace by controlling the mechanisms for device discovery, configuration and hot plug operations. In some embodiments, this may be similar to how typical firmware, such as a basic input/output system (BIOS) or operating systems discover I/O devices in a system.

Block 120 illustrates that the VMM may create a namespace mapping function for each VM to map specific devices from its primary namespace to the VMs namespace. In some embodiments, these namespace mapping functions may be generated statically based on user configuration or policies for VM device assignment. In other embodiments, the mapping function may be dynamically generated and applied to respond to system conditions (such as system thermal or power status), user actions (such as device hot plugging) or device in-activity.

Block 130 illustrates that the VMM may trap attempts by guest software in a VM to enumerate and configure devices in its virtual I/O fabric (secondary namespace). One embodiment may utilize virtualization support in processor hardware to explicitly trap and handle device enumeration and configuration operations from VMs with direct hardware access. In one specific embodiment, I/O fabric, specifically PCI, enumeration may be done through specific I/O ports. Hardware support for virtualization may provide I/O port bitmaps to explicitly trap access to specific I/O ports while allowing direct access to others. This is contrasted with existing software only solutions that have no choice but to trap all the I/O ports, which hinders direct access to the I/O ports of a specific device.

Block 140 illustrates that the namespace mapping function may be applied to manage devices that are exposed on a VMs virtual I/O fabric. In one embodiment, the mapping function may enumerate only physical devices assigned exclusively to a VM on its I/O fabric. Another embodiment may expose both assigned physical devices and emulated virtual devices (such as when the physical device is being shared by multiple VMs through the VMM) on a VM's virtual I/O fabric. In yet another embodiment, the VMM may expose a virtual I/O fabric structure to a VM that allows optimization or simplification of management operations on its partitioned devices.

Block 150 illustrates that the VMM may virtualize and expose to a VM, mechanisms for dynamic insertion or removal of assigned physical devices. One embodiment may expose these mechanisms as virtual hot plug controllers or other mechanisms compatible to the emulated I/O fabric and map it over equivalent mechanisms on the physical system. Another embodiment may utilize the dynamic removal and insertion of devices to a VM based on user actions or operating conditions. Given the generality of the VMM based namespace mapping method many other embodiments are possible that can specialize for specific requirements.

A technique to enable the direct mapping of physical device resources to a VM may need to address at least three types of interactions typical between guest software and I/O: (a) processor access to device memory-mapped and I/O mapped resources; (b) device access to system memory; and (c) events generated from device and delivered to processor. Each of these interactions may require some sort of translation function between guest and host attributes that are, ideally, transparent to the guest software and the physical device. Attributes used in the translation function may include: guest and host physical addresses for memory-mapped resources, guest and host I/O port addresses for I/O-mapped resources, guest and host interrupt vector addresses and any other relevant attributes that needs translation. For frequently utilized and performance sensitive interactions, the translation function may be accelerated through hardware support, while in-frequent, less performance sensitive interactions may continued to be proxied and translated indirectly through VMM software. Additionally, to setup and apply the translation function correctly, the guest and host address attributes to assigned device resources need to be tracked by the VMM at all times.

Figure 2:
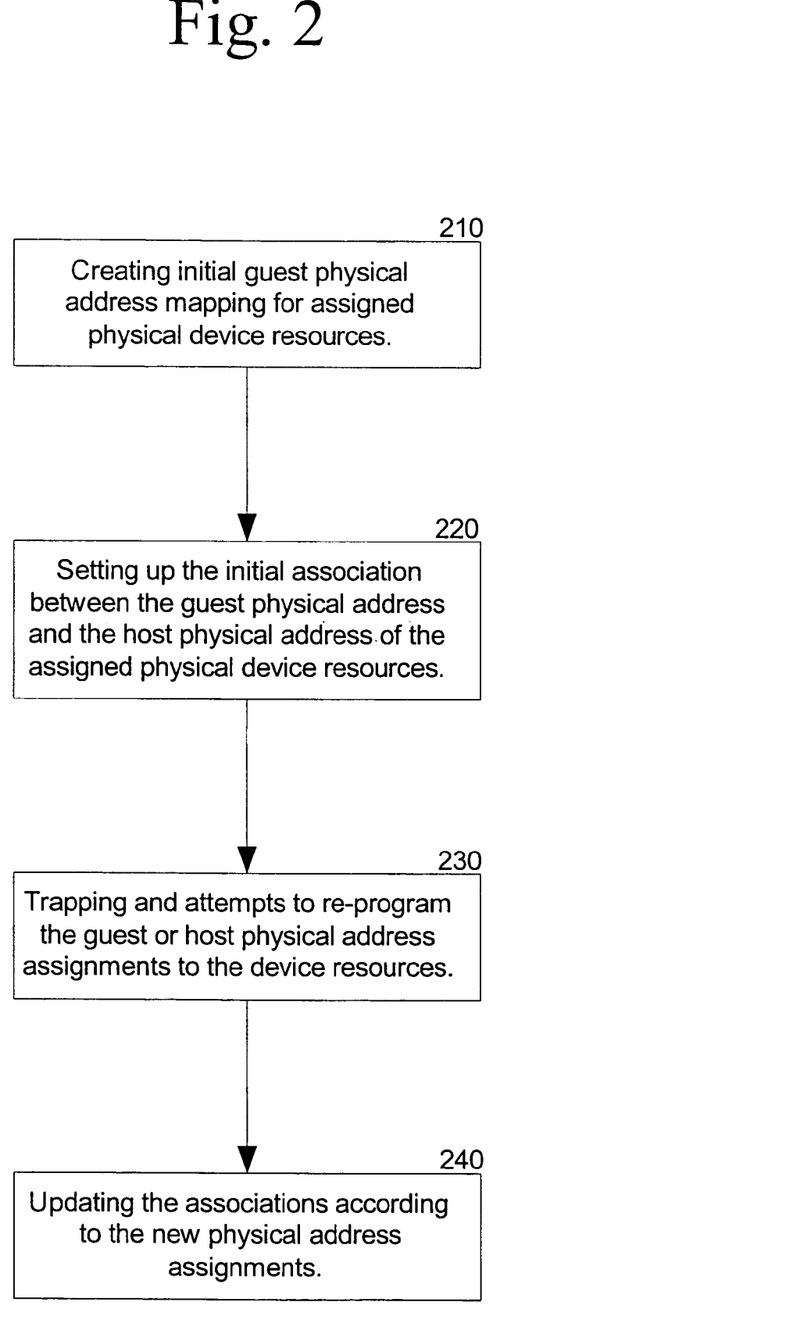
FIG. 2 is a flowchart illustrating an embodiment of a technique for direct mapping resources of partitioned I/O devices to virtual machine(s) utilizing hardware support for virtualization in accordance with the disclosed subject matter.

FIG. 2 is a flowchart illustrating an embodiment of a technique for direct mapping resources of partitioned I/O devices to virtual machine(s) utilizing hardware support for virtualization in accordance with the disclosed subject matter. The host attribute settings are typically initialized by system initialization firmware, a host operating system, a VMM or a combination thereof. Block 210 illustrates that the VMM may initialize the guest attribute settings as part of virtual I/O fabric configuration. Specifically, in one embodiment, the VMM or the guest VM firmware may create an initial guest physical address mapping for an exclusive use, as opposed to shared, physical devices. In one embodiment, the VMM may group the addresses of the exclusive use devices in such a way that the addresses of the various devices are contiguous, or otherwise convenient for the VMM to manage. In some embodiments this may be done by the VMM itself, the VM's virtual firmware or a combination of these.

Block 220 illustrates that the VMM may setup the initial translation structures by associating corresponding host and guest attributes or I/O addresses. In one embodiment, an addresses mapping may be created between guest physical and host physical addresses for exclusive use physical devices. In some embodiments, depending on the translation facility, the associations may include additional information (for example the guest kernel virtual address) which may become available only after the guest OS has loaded.

Block 230 illustrates that the VMM may trap any attempts by guest software or host software if VMM is part of a host OS) to re-program the guest (or host) attributes. In one embodiment, a guest (or host) may attempt to re-program the interrupt vectors or address of memory mapped registers of the assigned device as part of processes of re-balancing the VM's I/O hierarchy. The VMM may then trap the attempt to remap the address assignments, and, in one embodiment, re-program the guest to host address translation tables. Block 240 illustrates that the VMM may track the new guest (or host) attributes and updates the associations used for translating.

Figure 3:
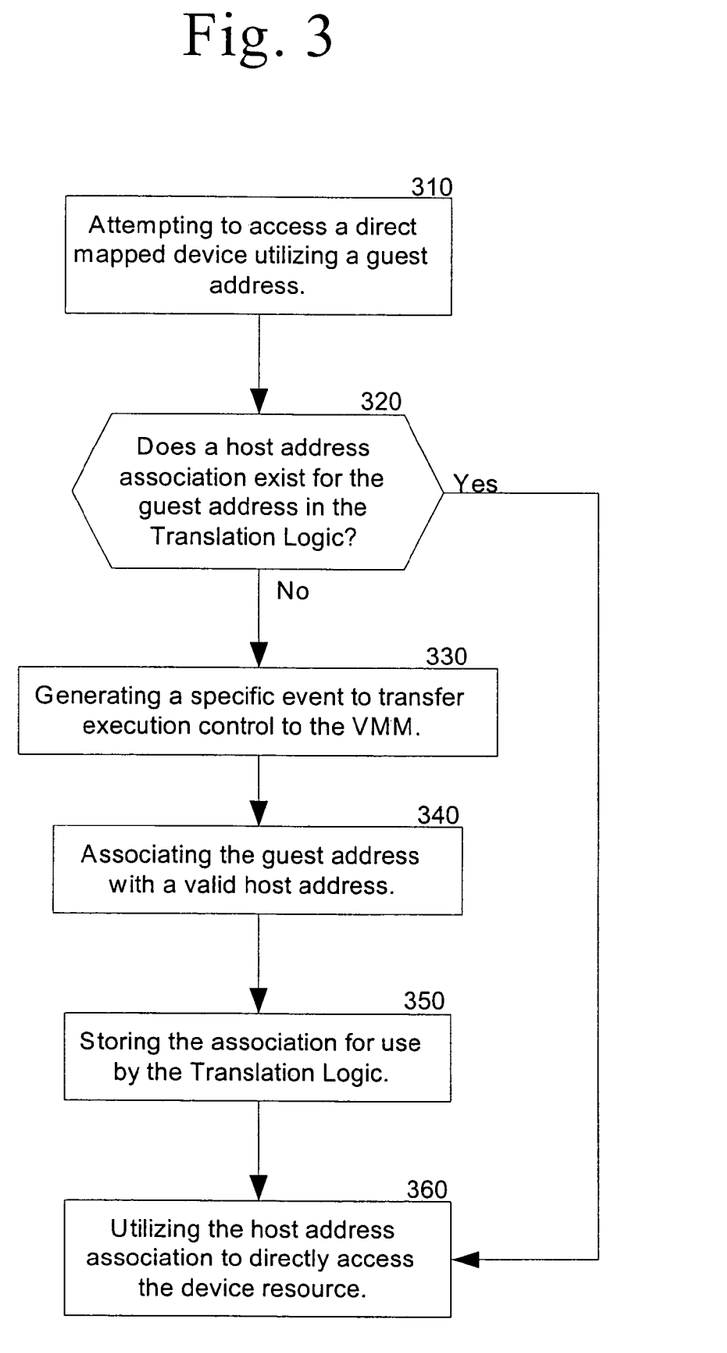
FIG. 3 is a flowchart illustrating an embodiment of a technique for I/O Device management of virtual machine(s) using hardware address mapping in accordance with the disclosed subject matter.

FIG. 3 is a flowchart illustrating an embodiment of a technique for translating between guest and host physical addresses at a page granularity to enable direct-mapping of memory-mapped device resources without trapping by the VMM. The granularity for translations between guest and host attributes may vary depending on the translation mechanism and the attribute type being translated; therefore, the disclosed matter is not limited to any one level of granularity, page level or otherwise.

Block 310 illustrates a VM may attempt to access a memory-mapped resource of the assigned direct mapped device. In one embodiment, the VM may attempt to access the device utilizing a guest attribute. In one embodiment, the guest OS may use a virtual address for the access attempt which has a valid guest physical address translation in the guest page tables.

Block 320 illustrates that a translation logic may check if an association exists between the guest attribute to a host physical address. Depending on the translation method, the guest attribute checked could be guest physical address, guest virtual address or a combination of these. One embodiment may utilize a virtual memory virtualization technique including a virtual translation lookaside buffer (VTLB) such as the matter disclosed in the previously filed patent application Ser. No. 09/752,133, titled "A Virtual Translation Look aside Buffer," by Neiger, et al. Another embodiment may perform the guest to host translation by utilizing or adding to the address translation facilities in processor hardware.

Block 360 illustrates that, if a valid association check exists, the translation mechanism may use the association to complete the guest access with the resulting host physical address without involving the VMM.

Blocks 330, 340, & 350 illustrate the case when an association is not found in the translation logic. In one embodiment of such a case the VMM may trap the attempt to access the device, thus allowing it to setup the proper associations for possible future translations. Unlike general purpose memory which can be paged by the guest or VMM (host OS) independently, pages containing memory-mapped device addresses are often non-pageable in both guest and VMM. This, along with the technique illustrated in FIG. 2, make the path from Block 320 directly to Block 360 the common case.

Block 330 illustrates that, if no association is found, the translation logic may generate a specific event to transfer execution control to the VMM, or other device. Block 340 illustrates that the VMM or host operating system virtualization driver may associate the virtual address with the physical address without the aid of the translation logic. In one embodiment, page faults may be utilized as the execution control transfer event and the VMM may detect that the trapped page fault is due to access of a direct memory mapped device. In one embodiment, the VMM may to do this by looking at the virtual address in the page table that maps to the guest virtual address and detecting that the virtual address is associated with the direct mapped device by comparing the virtual address to a guest-to-host attribute translation table maintained by the VMM.

Block 350 illustrates that once the proper translation has been determined, the address mapping may be stored within the translation logic for future use. It is contemplated that the translation logic may have a limited number of entries. In one embodiment, a most recently used algorithm may be used to storing and deleting entries from the translation logic; however, other techniques of dealing with a limited translation logic storage capability are within the scope of the disclosed matter. In one embodiment, the VMM may resume execution from the instruction that caused the page fault. Block 360 illustrates that the translation mechanism or the VMM may use the association to complete the guest access with the resulting host physical address.

In another embodiment, I/O mapped resource translations may be achieved more simply by opportunistically partitioning the host I/O port space across VMs without any translation and enable direct access from each VM to its partitioned I/O ports. In cases when an I/O port address use conflict is detected between multiple VMs or with the host, the translation may be done by trapping to the VMM as before. Direct access of devices from guest software causes the devices to be programmed by the guest with guest physical addresses for device bus master transactions such as direct memory access DMA. This requires the guest to host translation function to be applied for transactions originating from the device destined to system memory. This translation need to be consistent with any processor translation schemes. In some embodiments these translations may reside on the I/O device itself, on some intermediate chipset logic, or a combination thereof.

Figure 4:
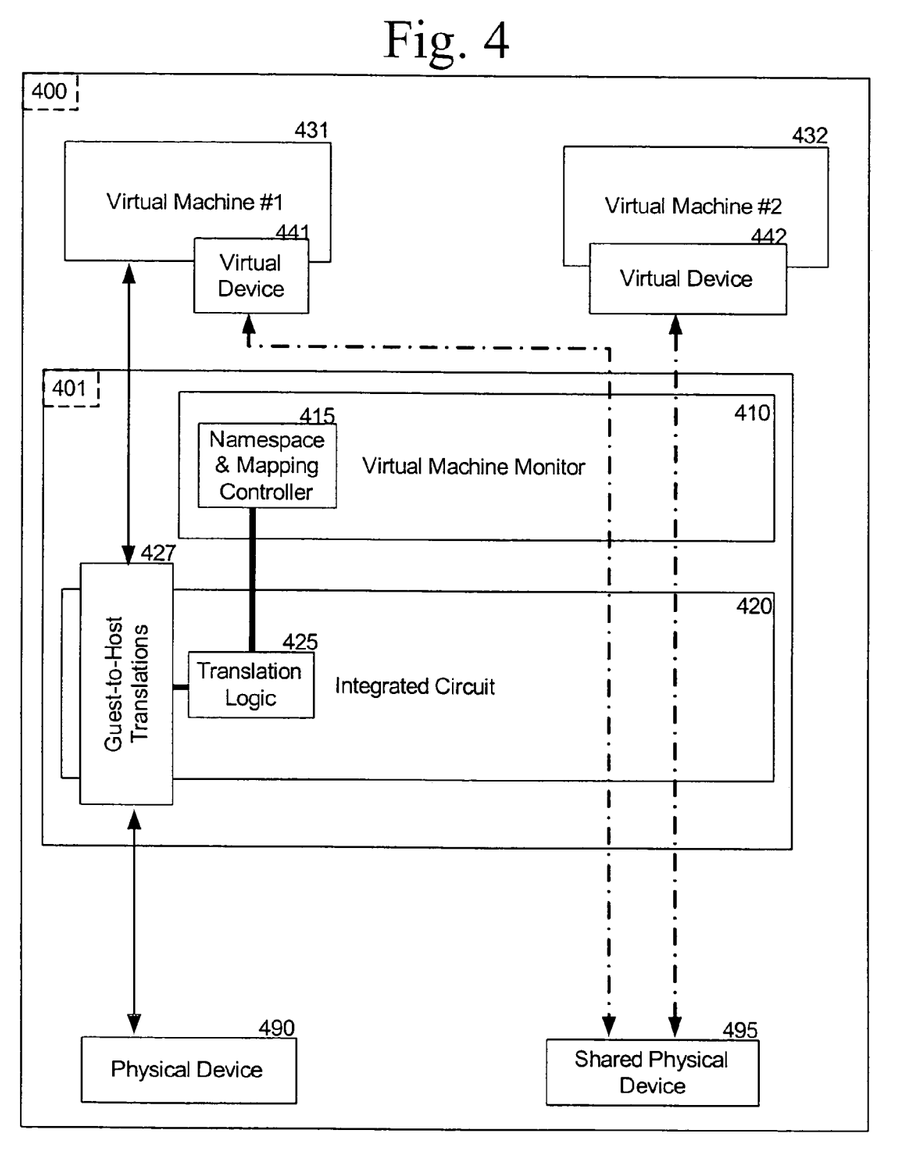
FIG. 4 is a block diagram illustrating an embodiment of an apparatus and a system that allows for I/O resource partitioning and direct mapping to virtual machine(s) using hardware support for virtualization in accordance with the disclosed subject matter.

FIG. 4 is a block diagram illustrating an embodiment of an apparatus 401 and a system 400 that allows for I/O resource partitioning and direct mapping to virtual machine(s) using hardware support for virtualization in accordance with the disclosed subject matter. In one embodiment, the apparatus may include a VMM 410, having a namespace & mapping controller 415, and an integrated circuit 420, having a translation logic 425. In one embodiment, the integrated circuit may be a processor or a portion of a chipset or other device. In another embodiment, the translation logic may be distributed amongst various integrated circuits. In one embodiment, the system may include the apparatus, a first virtual machine 431, having a virtual device 441, a second virtual machine 432, having a virtual device 442, a shared physical device 495, and an exclusive use direct mapped physical device 490.

The namespace & mapping controller 415 may be capable of managing the visibility of partitioned I/O devices to virtual machines, specifically the first and second virtual machines 431 & 432. In one embodiment, the namespace & mapping controller may be capable of performing the technique illustrated by FIG. 1 and described above.

The VMM 410 may, in one embodiment, initialize and track the guest-to-host address and attribute translations. In one embodiment, the VMM may configure and maintain the guest-to-host translations 427. In one embodiment, the guest-to-host translations may be stored within a table in a memory element. In one embodiment, the VMM may be capable of performing the technique illustrated by FIG. 2 and described above.

The translation logic 425 may be capable of providing a guest-to-host attribute translation without involving the VMM 410. In one embodiment, the first VM 431 may use the translation logic to access the direct mapped physical device 490. In another embodiment, the first VM may also use the VMM to access the physical device if the guest-to-host mapping is not accessible to the translation logic. In one embodiment, the translation logic may use the guest-to-host translation table 427 configured by the VMM to facilitate the access of the physical device. In one embodiment, the VMM and translation logic may be capable of performing the technique illustrated by FIG. 3 and described above.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, network or communication processors, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. A method of partitioning resources to a virtual machine comprising:
   enumerating and controlling input/output ("IO") devices in a primary namespace;
   creating a namespace mapping function to map one of the IO devices from the primary namespace to the virtual machine's namespace;
   trapping an attempt by the virtual machine to enumerate and configure the IO devices within the virtual machine's IO fabric; and
   utilizing the namespace mapping function to allow the virtual machine to enumerate and configure only IO devices that are partitioned to the virtual machine, wherein utilizing the namespace mapping function includes;
   directly exposing IO devices that are exclusively partitioned to the virtual machine,
   in-directly exposing IO devices that are shared between the virtual machine and, at least, a second virtual machine, and
   exposing a virtual IO fabric structure to virtual machine that facilitates simplification of management operations on the partitioned IO devices.

2. The method of claim 1, further including:
   virtualizing and exposing to the virtual machine mechanisms for dynamic insertion and removal of partitioned IO devices.

3. The method of claim 2, wherein the partitioned IO devices include virtual hot plug controllers.

4. The method of claim 1, wherein creating a namespace mapping function includes:
   dynamically generating the namespace mapping function based, at least in part, upon changes in a system condition.

5. The method of claim 1, wherein trapping an attempt by the virtual machine includes:
   utilizing a virtualization support mechanism included by a hardware device.

6. The method of claim 5, wherein a processor includes the virtualization support mechanism; and
   the virtualization support mechanism is capable of explicitly trapping and handling IO device enumeration and configuration operations from virtual machines with direct hardware access.

7. The method of claim 6, wherein the virtualization support mechanism includes:
   IO port bitmaps to explicitly trap access to specific a first set IO ports, and substantially simultaneously allow direct access to a second set of IO ports.

8. The method of claim 1, wherein creating a namespace mapping function includes creating a namespace that facilitates IO device partitioning at multiple levels of granularity; and
   wherein the levels of granularity are selected from a group including:
   a particular IO device,
   a device category, an IO bus, and
an IO hierarchy.

9. An article comprising:
a machine accessible medium having a plurality of machine accessible instructions,
wherein when the instructions are executed, the instructions provide for:
enumerating and controlling input/output devices in a primary namespace;
creating a namespace mapping function to map one of the IO devices from the primary namespace to the virtual machine's namespace;
trapping an attempt by the virtual machine to enumerate and configure the IO devices within the virtual machine's IO fabric; and
utilize the namespace mapping function to allow the virtual machine to enumerate and configure only IO devices that are partitioned to the virtual machine, wherein utilizing the namespace mapping function includes;
directly exposing IO devices that are exclusively partitioned to the virtual machine,
in-directly exposing IO devices that are shared between the virtual machine and, at least, a second virtual machine, and
exposing a virtual IO fabric structure to the virtual machine that facilitates simplification of management operations on the partitioned IO devices.

10. The article of claim 9, further including instructions providing for:
virtualizing and exposing to the virtual machine mechanisms for dynamic insertion and removal of partitioned IO devices.

11. The article of claim 10, wherein the partitioned IO devices include virtual hot plug controllers.

12. The article of claim 9, wherein the instructions providing for creating a namespace mapping function includes instructions providing for:
dynamically generating the namespace mapping function based, at least in part, upon changes in a system condition.

13. The article of claim 9, wherein the instructions providing for trapping an attempt by the virtual machine includes instructions providing for:
utilizing a virtualization support mechanism included by a hardware device.

14. The article of claim 13, wherein a processor includes the virtualization support mechanism; and
the virtualization support mechanism is capable of explicitly trapping and handling IO device enumeration and configuration operations from virtual machines with direct hardware access.

15. The article of claim 14, wherein the virtualization support mechanism includes:
IO port bitmaps to explicitly trap access to specific a first set IO ports, and substantially simultaneously allow direct access to a second set of IO ports.

16. The article of claim 9, wherein the instructions providing for creating a namespace mapping function includes instructions providing for creating a namespace that facilitates IO device partitioning at multiple levels of granularity; and
wherein the levels of granularity are selected from a group including:
a particular IO device,
a IO device category,
an IO bus, and
an IO hierarchy.

17. An apparatus comprising:
a processor to control a plurality of input/output (IO) devices; and
a virtual machine monitor having a namespace and mapping controller to:
enumerate and control the plurality of IO devices in a primary namespace;
create a namespace mapping function to map one of the plurality of IO devices from the primary namespace to the virtual machine's namespace; and
utilize the namespace mapping function to allow the virtual machine to enumerate and configure only IO devices that are partitioned to the virtual machine, wherein utilizing the namespace mapping function includes:
directly exposing IO devices that are exclusively partitioned to the virtual machine,
in-directly exposing IO devices that are shared between the virtual machine and, at least, a second virtual machine, and
exposing a virtual IO fabric structure to the virtual machine that facilitates simplification of management operations on the partitioned IO devices; and
wherein the virtual machine monitor is capable of trapping an attempt by the virtual machine to enumerate and configure the IO devices within the virtual machine's IO fabric.

18. The apparatus of claim 17, wherein the virtual machine monitor is further capable of:
virtualizing and exposing to the virtual machine mechanisms for dynamic insertion and removal of partitioned physical IO devices.

19. The apparatus of claim 18, wherein the partitioned IO devices include virtual hot plug controllers.

20. The apparatus of claim 17, wherein the namespace and mapping controller is capable of creating a namespace mapping function by:
dynamically generating the namespace mapping function based, at least in part, upon changes in a system condition.

21. The apparatus of claim 17, wherein the virtual machine monitor is capable of trapping an attempt by the virtual machine by:
utilizing a virtualization support mechanism included by an IO device.

22. The apparatus of claim 21, further including a processor comprising the virtualization support mechanism; and
the virtualization support mechanism is capable of explicitly trapping and handling IO device enumeration and configuration operations from virtual machines with direct hardware access.

23. The apparatus of claim 22, wherein the virtualization support mechanism includes:
IO port bitmaps to explicitly trap access to specific a first set IO ports, and substantially simultaneously allow direct access to a second set of IO ports.

24. The apparatus of claim 17, wherein the namespace and mapping controller is capable of creating a namespace mapping function by creating a namespace that facilitates IO device partitioning at multiple levels of granularity; and
wherein the levels of granularity are selected from a group including:
a particular IO device,
an IO device category,
an IO bus, and
an IO hierarchy.

25. A system comprising:
a plurality of virtual machines;
a plurality of input/output (IO) devices, having a first portion that is partitioned for the exclusive use of a virtual machine and a second portion that is capable of being shared by the virtual machines;
a virtual machine monitor having a namespace and mapping controller to:
  enumerate and control the plurality of IO devices in a primary namespace;
  create a namespace mapping function to map one of the plurality of IO devices from the primary namespace to the virtual machine's namespace; and
  utilize the namespace mapping function to allow the virtual machine to enumerate and configure only IO devices that are partitioned to the virtual machine, wherein utilizing the namespace mapping function includes;
    directly exposing IO devices that are exclusively partitioned to the virtual machine,
    in-directly exposing IO devices that are shared between the virtual machine and, at least, a second virtual machine, and
    exposing a virtual IO fabric structure to the virtual machine that facilitates simplification of management operations on the partitioned IO devices; and
  wherein the virtual machine monitor is capable of trapping an attempt by the virtual machine to enumerate and configure the IO devices within the virtual machine's IO fabric.

26. The system of claim 25, wherein the virtual machine monitor is further capable of:
virtualizing and exposing to the virtual machine mechanisms for dynamic insertion and removal of partitioned physical devices.

27. The system of claim 26, wherein the IO physical devices include virtual hot plug controllers.

28. The system of claim 25, wherein the namespace and mapping controller is capable of creating a namespace mapping function by:
dynamically generating the namespace mapping function based, at least in part, upon changes in a system condition.

29. The system of claim 25, wherein the virtual machine monitor is capable of trapping an attempt by the virtual machine by:
utilizing a virtualization support mechanism included by a hardware device.

30. The system of claim 29, further including a processor comprising the virtualization support mechanism; and
the virtualization support mechanism is capable of explicitly trapping and handling IO device enumeration and configuration operations from virtual machines with direct hardware access.

31. The system of claim 30, wherein the virtualization support mechanism includes:
IO port bitmaps to explicitly trap access to specific a first set IO ports, and substantially simultaneously allow direct access to a second set of IO ports.

32. The system of claim 25, wherein the namespace and mapping controller is capable of creating a namespace mapping function by creating a namespace that facilitates IO device partitioning at multiple levels of granularity; and
wherein the levels of granularity are selected from a group including:
  a particular IO device,
  an IO device category,
  an IO bus, and
  an IO hierarchy.

* * * * *